United States Patent [19]

O'Sullivan

[11] Patent Number: 5,214,689
[45] Date of Patent: May 25, 1993

[54] INTERACTIVE TRANSIT INFORMATION SYSTEM

[75] Inventor: Daniel O'Sullivan, Aberdeen, N.J.

[73] Assignee: Next Generaton Info, Inc., Morgan Ville, N.J.

[21] Appl. No.: 826,677

[22] Filed: Jan. 27, 1992

Related U.S. Application Data

[63] Continuation of Ser. No. 584,427, Sep. 13, 1990, abandoned, which is a continuation of Ser. No. 334,096, Apr. 5, 1989, abandoned, which is a continuation-in-part of Ser. No. 155,146, Feb. 11, 1989, abandoned.

[51] Int. Cl.$^5$ .................... H04M 1/64; H04M 3/50; H04M 11/08
[52] U.S. Cl. ........................................ 379/88; 379/97; 379/201
[58] Field of Search ............... 379/67, 88, 89, 77, 379/84, 97, 201, 207

[56] References Cited

U.S. PATENT DOCUMENTS

| | | | |
|---|---|---|---|
| 4,360,875 | 11/1982 | Behnke | 379/95 X |
| 4,649,563 | 3/1987 | Riskin | 379/97 |
| 4,706,270 | 11/1987 | Astegiano et al. | 379/2 |
| 4,716,583 | 12/1987 | Groner et al. | 379/88 |
| 4,817,129 | 3/1989 | Riskin | 379/88 |

OTHER PUBLICATIONS

"Voice Response System and Its Applications", Y. Ozawa et al., *Hitachi Review* (Japan), vol. 28, No. 6, Dec. 1979, pp. 301-305.
"A Conversational Mode Airline Information and Reservation System Using Speech Input and Output", S. Levinson et al, Proc. of IEEE International Conf. on Acoustics, Speech and Signal Processing, Denver, Colorado, Apr. 1980, pp. 203-208.
"Speech Communication for Personal Computers", P. Jakatdar et al., *Electrical Communication*, vol. 60, No. 1, 1986, pp. 76-86.
"Conversant 1 Voice Systems: Architecture and Applications", R. Perdue et al., *AT&T Tech. Journal*, vol. 65, No. 5, Sep./Oct. 1986, pp. 34-47.
"Technology now offers more than just voice mail", D. Stusser, *Telecommunictaions Products & Technology*, Jul. 1987, pp. 19, 20, 24 & 26-28.

Primary Examiner—Thomas W. Brown
Attorney, Agent, or Firm—Cohen, Pontani, Lieberman & Pavane

[57] ABSTRACT

An interactive transportation information system provides schedule information to a caller utilizing a Touch-Tone type telephone. The system includes a database storing a digital code specific to each station, schedule information and a plurality of speech files for generating messages to the caller. Voice messages prompt the caller to press keypad buttons for a departure station, an arrival station, and a desired departure or arrival time. The database is then searched for a transportation vehicle departing the departure station at the time closest to the desired time, whereupon a voice message is generated identifying its departure and arrival times. The system also resolves station name ambiguities and simplifies dialogue for travel to and from the stations.

25 Claims, 15 Drawing Sheets

PROMPT 1

GREETING MESSAGE

"HELLO, YOU HAVE REACHED COMPANY NAME COMPUTERIZED INFORMATION SYSTEM. IF YOU WOULD LIKE TO WAIT FOR A REPRESENTATIVE, PLEASE STAY ON THE LINE. IF YOU ARE USING A TOUCH-TONE TELEPHONE YOU CAN GET TRANSIT INFORMATION IMMEDIATELY BY PUSHING NUMBER "1"

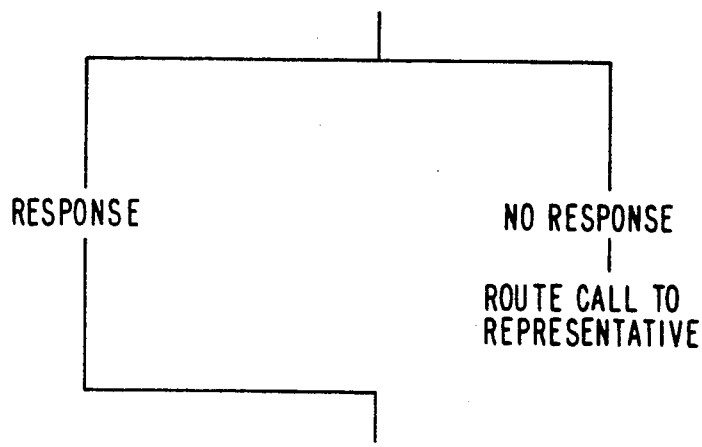

PROMPT 2

"THANK YOU. IF YOU KNOW WHICH BUTTONS TO PUSH, THERE IS NO NEED TO LISTEN TO THE END OF EACH MESSAGE. IF YOU ARE LEAVING FROM HUB STATION, PUSH NUMBER 1. IF YOU ARE GOING TO HUB STATION, PUSH NUMBER 2. IF YOU ARE NOT LEAVING FROM OR GOING TO HUB STATION, PUSH NUMBER 3."

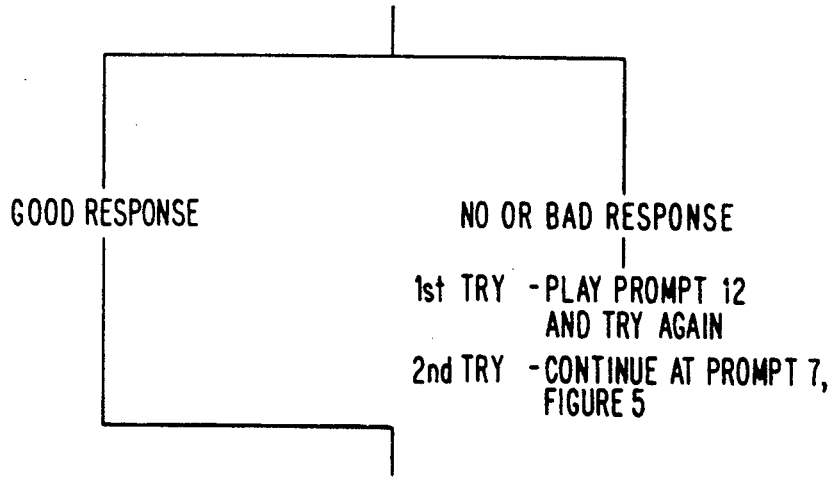

CONTINUED FROM FIGURE 2

BUTTON 1 PUSHED

PROMPT 3

"SPELL THE FIRST FOUR LETTERS OF THE NAME OF THE STATION YOU ARE GOING TO, USING THE PUSH BUTTONS, NOW."

VALID STATION NAME

INVALID STATION NAME
(10 SECONDS PER LETTER)

1st TRY - PLAY PROMPT 13 AND TRY AGAIN
2nd TRY - CONTINUE AT PROMPT 7, FIGURE 5

PLAY THE STATION NAME

RETRY PROMPTS

PROMPT 12  "PLEASE TRY AGAIN.
IF YOU ARE LEAVING FROM HUB STATION, PUSH NUMBER 1.
IF YOU ARE GOING TO HUB STATION, PUSH NUMBER 2.
IF YOU ARE NOT LEAVING FROM OR GOING TO HUB STATION,
PUSH NUMBER 3.
IF YOU WOULD LIKE TO WAIT FOR A REPRESENTATIVE,
JUST PUSH THE OPERATOR BUTTON."

PROMPT 13  "THAT WAS AN INVALID SPELLING, PLEASE TRY AGAIN.
SPELL THE FIRST FOUR LETTERS OF THE NAME OF THE
STATION YOU ARE GOING TO, USING THE PUSH BUTTONS
IF YOU WOULD LIKE TO WAIT FOR A REPRESENTATIVE,
JUST PUSH THE OPERATOR BUTTON."

PROMPT 14  "PLEASE TRY AGAIN.
FOR DEPARTURES BETWEEN MONDAY AND FRIDAY,
PUSH NUMBER 1.
FOR DEPARTURES ON SATURDAYS PUSH NUMBER 2.
FOR DEPARTURES ON SUNDAYS AND HOLIDAYS,
PUSH NUMBER 3.
IF YOU WOULD LIKE TO WAIT FOR A REPRESENTATIVE,
JUST PUSH THE OPERATOR BUTTON."

PROMPT 15  "THAT WAS AN INVALID TIME, PLEASE TRY AGAIN.
PUSH THE NUMBERS INDICATING THE TIME YOU WOULD
LIKE TO LEAVE, FOLLOWED BY THE LETTERS AM OR PM.
IF YOU WOULD LIKE TO WAIT FOR A REPRESENTATIVE,
JUST PUSH THE OPERATOR BUTTON."

*FIG. 6*

[ THERE IS A TRAIN AT ] [ 3:15 P.M. ] [ WHICH WILL ARRIVE AT ] [ 4:06 P.M. ]
1          2  3    4             5             6  7    8

FIG. 7

```
                COMPANY NAME
        FARE AND SCHEDULE TRACKING SYSTEM

MAIN MENU

1. MAKE PERIODIC SCHEDULE CHANGES
    2. MAKE PERIODIC FARE CHANGES
    3. MAKE DISKETTE BACKUP OF DATABASE
    4. CHANGE SYSTEM PASSWORD
    5. CHANGE ENTIRE SCHEDULE AND FARE DATABASE
    6. EXIT DATABASE AND BRING FASTRACK™ ON-LINE

ENTER NUMBER -> 1

COPYRIGHT (C) NEXT GENERATION INFORMATION, INC. 1987
                ALL RIGHTS RESERVED
```

*FIG. 8*

| STATION: MATAWAN | | | | ROUTE NUMBER: 1 | | | | STATION NUMBER: 2 | | | |
|---|---|---|---|---|---|---|---|---|---|---|---|
| BRANCH NUMBER: 2 | | | | HUB NUMBER: 3 | | | | FARE ZONE: 5 | | | |

DEPARTURE TIMES

| 535 | 602 | 640 | 705 | 710 | 743 | 807 | 810 | 840 | 907 | 910 | 940 |
|---|---|---|---|---|---|---|---|---|---|---|---|
| 1007 | 1010 | 1040 | 1107 | 1110 | 1140 | 1207 | 1210 | 1240 | 1307 | 1310 | 1340 |
| 1407 | 1410 | 1440 | 1507 | 1510 | 1540 | 1602 | 1605 | 1607 | 1621 | 1629 | 1636 |
| 1641 | 1644 | 1654 | 1659 | 1702 | 1705 | 1708 | 1710 | 1715 | 1718 | 1720 | 1723 |
| 1726 | 1730 | 1732 | 1734 | 1736 | 1738 | 1745 | 1753 | 1800 | 1802 | 1805 | 1807 |
| 1810 | 1815 | 1819 | 1829 | 1834 | 1837 | 1840 | 1906 | 1908 | 1910 | 1940 | 2007 |
| 2010 | 2040 | 2107 | 2110 | 2140 | 2207 | 2210 | 2240 | 2320 | 2340 | 35 | 40 |
| 130 | ---- | ---- | ---- | ---- | ---- | ---- | ---- | ---- | ---- | ---- | ---- |

ARRIVAL TIMES

| 600 | 630 | 700 | 710 | 718 | 720 | 731 | 733 | 740 | 742 | 746 | 749 |
|---|---|---|---|---|---|---|---|---|---|---|---|
| 754 | 757 | 759 | 801 | 804 | 810 | 812 | 814 | 814 | 816 | 820 | 824 |
| 828 | 830 | 833 | 835 | 839 | 843 | 848 | 850 | 854 | 856 | 903 | 905 |
| 907 | 909 | 912 | 914 | 922 | 920 | 935 | 938 | 950 | 1000 | 1003 | 1033 |
| 1043 | 1048 | 1110 | 1133 | 1139 | 1203 | 1233 | 1239 | 1303 | 1333 | 1339 | 1403 |
| 1433 | 1439 | 1503 | 1533 | 1539 | 1603 | 1633 | 1639 | 1703 | 1733 | 1746 | 1808 |
| 1839 | 1841 | 1903 | 1933 | 1939 | 2003 | 2033 | 2039 | 2103 | 2133 | 2139 | 2203 |
| 2239 | 2303 | 2339 | 3 | 104 | 128 | ---- | ---- | ---- | ---- | ---- | ---- |

ENTER D FOR DEPARTURES, A FOR ARRIVALS (OR END) →

*FIG. 9*

```
            CHANGING FARES FOR ROUTE → NORTH JERSEY

CHANGES BEING MADE FOR FARES FROM ZONE 0 TO ZONE 2
CURRENT ONE-WAY COACH FARE                             375
CURRENT ONE-WAY OFF-PEAK FARE                          275
CURRENT WEEKLY COMMUTATION FARE                        2500
CURRENT MONTHLY COMMUTATION FARE                       8200
CURRENT SCHOOL COMMUTATION FARE                        5500
CURRENT SENIOR CITIZENS FARE                           0

OPTIONS AVAILABLE

1. CHANGE ONE-WAY COACH FARE
2. CHANGE ONE-WAY OFF-PEAK FARE
3. CHANGE WEEKLY COMMUTATION FARE
4. CHANGE MONTHLY COMMUTATION FARE
5. CHANGE SCHOOL COMMUTATION FARE
6. CHANGE SENIOR CITIZENS FARE

ENTER NUMBER → 1
```

*FIG. 10*

FASTRACK™ SYSTEM ON-LINE

| LINE NUMBER | LINE STATUS | LINE NUMBER | LINE STATUS |
|---|---|---|---|
| 1 | IDLE | 11 | IDLE |
| 2 | ACTIVE | 12 | IDLE |
| 3 | IDLE | 13 | ACTIVE |
| 4 | ACTIVE | 14 | IDLE |
| 5 | IDLE | 15 | ACTIVE |
| 6 | IDLE | 16 | IDLE |
| 7 | ACTIVE | 17 | IDLE |
| 8 | IDLE | 18 | ACTIVE |
| 9 | IDLE | 19 | IDLE |
| 10 | IDLE | 20 | IDLE |

ON-LINE CALL STATISTICS

NUMBER OF CALLS ANSWERED TODAY = 2450
NUMBER OF CALLS COMPLETED TODAY = 2100
NUMBER OF CALLS FORWARDED TODAY = 350

ENTER SYSTEM PASSWORD TO BRING FASTRACK™ OFF-LINE

FIG. 11

PROMPT 5A
|

"FOR MORNING DEPARTURES, PUSH 1.
FOR AFTERNOON DEPARTURES, PUSH 2.
FOR EVENING DEPARTURES, PUSH 3.
FOR ALL DEPARTURES, PUSH 4."

"DEPARTURES ARE AS FOLLOWS
GIVE MORNING (TO 1215), AFTERNOON (TO 1715)
OR EVENING (TO 0015) DEPARTURE/ARRIVAL TIMES
IN FORMAT SHOWN AT TOP OF FIG. 5"

FIG. 15

INTERACTIVE TRANSIT INFORMATION SYSTEM

CROSS-REFERENCE TO RELATED APPLICATIONS

This application is a continuation of application Ser. No. 584,427, filed Sep. 13, 1990, now abandoned, which is a continuation of application Ser. No. 334,096, filed Apr. 5, 1989, now abandoned, which is a continuation-in-part of application Ser. No. 155,146, filed Feb. 11, 1988, now abandoned.

BACKGROUND OF THE INVENTION

1. Field of the Invention

This invention pertains to information dissemination systems, and particularly to interactive transportation information systems wherein users communicate with a database over conventional telephone lines.

2. Prior Art

It is the nature of many businesses that they occasion numerous telephone inquiries from customers and potential customers. Obviously, if each call is answered by an operator, a sufficient number of operators must be available to field the calls as they come in. The expense of doing so is obvious. Moreover, almost invariably there are peak times when the number of callers exceeds the number of operators. When this happens, incoming calls must be queued. Depending on the size of the imbalance between incoming calls and operators, the queue can become quite long, with the consequence that callers become frustrated, sometimes to the point where they hang up, possibly never to call again. The potential loss of business is apparent.

A further problem with operators is the variation in their speech. Operators with accents, poor diction, etc., can be unintelligible to some callers. At the very least, the problem can reduce efficiency by prolonging the conversation between the caller and the operator. Again, the added expense and potential for lost business is obvious.

Recognizing these problems, others have proposed interactive information systems wherein a caller accesses a prerecorded message. A simple example of such a system is one for informing the caller of the correct time or weather conditions. More sophisticated systems provide selective information to the caller. For example, in known telephone information systems, the caller initially accesses an operator who enters the caller's request into a computerized information retrieval system which then provides the phone number to the caller in the form of a prerecorded message. Also known are systems wherein the caller directly queries a database by depressing the appropriate buttons on a Touch-Tone type phone in response to prompts from the database. Typically the prompts are prerecorded messages, collectively known as dialogue, asking the caller to depress one of a plurality of buttons depending on the information requested. By responding to a series of such prompts, the caller is able to obtain highly specific information from the database without operator intervention. Such systems are used, for example, to provide stock quotes and brokerage account information. In the case of account information, it is obvious that the appropriate information in the database is uniquely identifiable by entering the client account number by depressing the appropriate buttons on a Touch-Tone telephone. On the other hand, in the case of stock quotes, for the caller to access the appropriate information in the database, the caller must first identify the specific stock name to the database. This, however, poses a problem, because each of the buttons 2 through 9 has three letters imprinted thereon. Consequently, if the caller identifies the stock by entering the stock name, or the first few letters thereof, there is a strong possibility of ambiguity, i.e. the sequence of buttons depressed for two different stocks may be the same, rendering it impossible for the system to distinguish between the two. Consequently, in known systems wherein the database stores information for a large number of stocks or the like, the user is provided with a reference card which assigns to each stock a unique number code which the user then enters on the keypad of the phone when information is desired for that stock. Of course, this is extremely inconvenient, as the caller must have the card available at all times. Furthermore, it is impractical for certain types of systems, such as transit information systems, where many callers may not be regular users of the system and hence will not have access to a reference card.

In interactive transit information systems, it is also important to keep the call time to a minimum without sacrificing accuracy. If calls are lengthy, the system is tied up too long with each call. Also, it leads to caller frustration. Consequently, it is highly desirable to keep the length of the dialogue with the caller to a minimum. This problem presents itself, for example, when a caller is required to enter an arrival or departure time. That is, it is desirable that the caller be able to enter a complete time, e.g. 1:15, in response to a single prompt. However, this presents ambiguity problems, e.g. the caller may have intended to enter 11:50. While the system can look for pauses of predetermined length as confirmation that the complete time has been entered, this slows the system. And if the pause time is too short, the number of incorrect time entries increases. If, instead, the caller enters the hour in response to a first prompt and the minutes in response to a second, the goal of shortening the call time is also defeated.

Also, for transit information systems to be effective, it is important that the system anticipate all possible caller responses. Otherwise, a significant number of callers may become disaffected and avoid the system, thereby defeating its function. Similarly, the system, once installed, must be easy to maintain and update, lest the system operator abandon the system due to undue complexity. Finally, it is also important that the system be capable of handling a large number of calls simultaneously, so that callers are not queued or constantly confronted with a busy signal.

In addition, it is important for the operator of an interactive transit information system to have the ability to update information in the system. For example, in the case of delays due to snow, fire, etc., it is desirable for the system operator to include emergency message information in the system on short notice, which information is then conveyed to all persons calling the system.

Accordingly, it is an object of the present invention to provide an interactive transit information system which achieves the above-mentioned objectives.

BRIEF DESCRIPTION OF THE DRAWINGS

In the drawings:

FIG. 2 is a partial dialogue tree for the system;

FIG. 3 is a another part of the dialogue tree;

FIG. 6 shows the retry prompts in the dialogue tree;

FIG. 7 shows the composition of a complete message from a plurality of speech files;

FIG. 8 is the main menu screen for the data base management aspect of the system according to the present invention;

FIG. 9 is a screen illustrating typical times for inbound and outbound trains from a particular station in the transit system;

FIG. 10 is a typical screen illustrating commutation fares for a particular route in the transit system;

FIG. 11 is a typical screen indicating the status of the incoming lines to the transit information system;

FIG. 15 shows yet a further alternative part of the dialogue tree of FIGS. 2-6.

SUMMARY OF THE INVENTION

Figure 1:
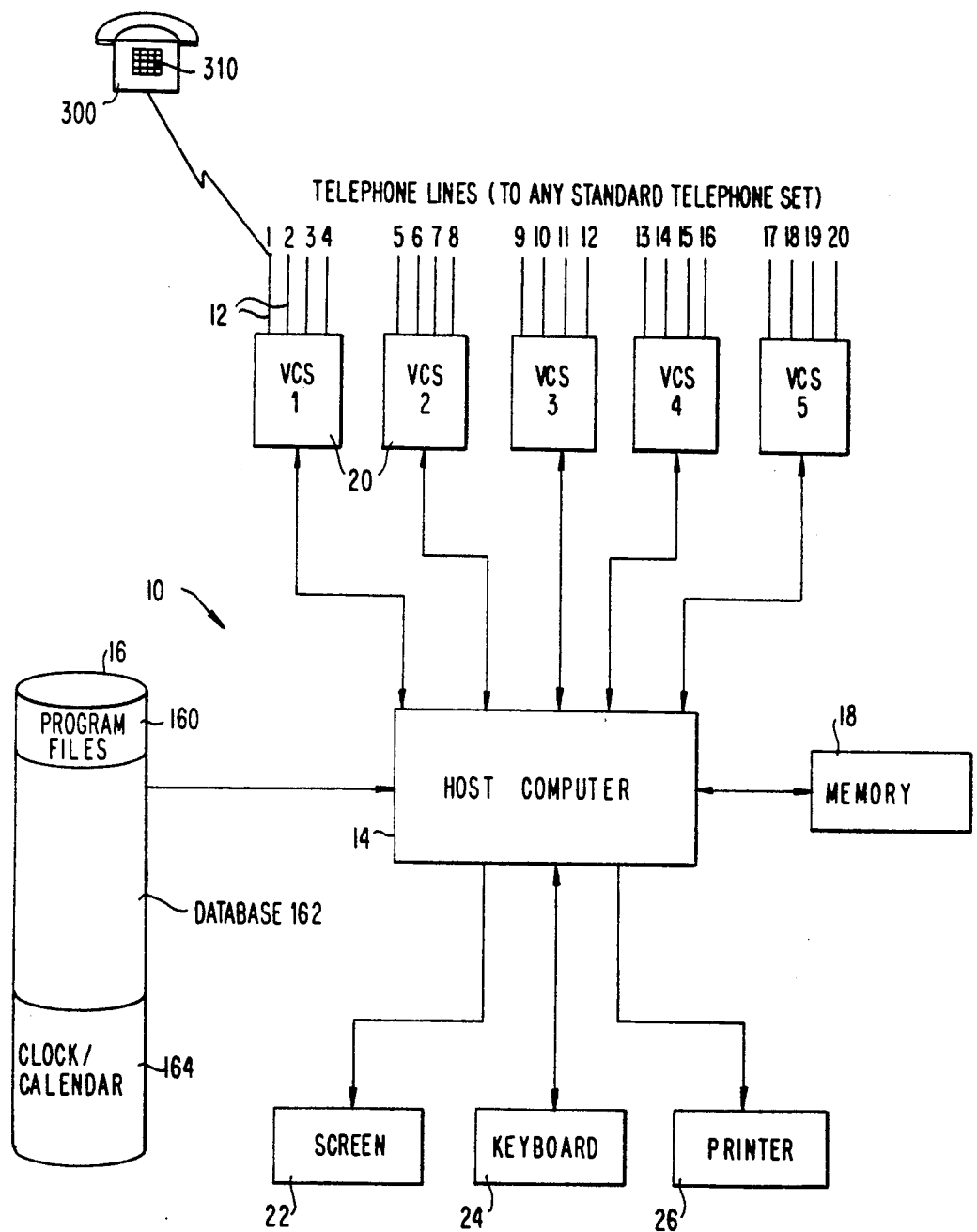
FIG. 1 is a diagrammatic representation of the interactive transit information system in accordance with the present invention.

Broadly speaking, the invention comprises a method for utilizing a hardware and software based interactive Dual Tone Multi-Frequency (DTMF)/speech response system, the system providing at least schedule information to a caller who seeks transportation information. The caller interacts with the system utilizing the keypad buttons on a DTMF-type telephone, and hears spoken instructions and information over the telephone in response to those keypad entries.

The system assigns a digital code to each transportation stop contained in the transportation system, the digital code corresponding to the DTMF tones generated by the spelling of the name of the station on a DTMF keypad. The system provides a database for storing these codes, as well as a plurality of speech files, and the transportation schedule of the overall transportation system. When a caller calls for transportation information, that caller is prompted by spoken prompts or messages, instructing the caller to enter the desired sequence of DTMF keypad entries. The caller is instructed—via spoken prompts generated from the stored speech files—to press at least one DTMF key on the telephone corresponding to the spelling of the name of a desired departure and/or arrival station, and the desired time of departure and/or arrival. The system then searches the stored transportation information database for the schedule of a transportation vehicle which corresponds as closely as possible to the desired travel plans of the caller, and generates a spoken message advising the caller of the closest matching transportation schedule. The system is so designed as to require a minimum of keystrokes on the DTMF keypad by the user, and to require no external user aids, such as station lists, codes or the like.

The system is readily modifiable and customizable, and can be so adapted to provide much more detailed information to the caller if necessary, as well as seek additional information from the caller, if desired. For instance, in systems with many stations, the caller could be instructed to enter at least three DTMF key entries for the spelling of the station names, or to indicate whether the caller is departing from or arriving at a "hub" station. The system can also readily echo the spoken names and times entered by the caller to validate the caller's entries, and to give appropriate instructions for correct or incorrect entries, or to wait a pre-determined pause period to determine if the caller's entries are finished. The system can also prompt for a specific DTMF entry so a caller can indicate his or her entries are complete. The system can also prompt for and recognize, in response the entry of at least one DTMF keypad entry, a desired day of departure and/or arrival. The prompts can also be arranged to instruct the caller how to hear previous prompts over again, or to jump ahead to other prompts.

The system contains a setup feature for eliminating ambiguities when the station names in the system contain the same few initial letters in their spelling, and/or if the initial spelling contains the letters q or z. The system can also resolve date ambiguities by determining the closest future date from the callers DTMF entry. The system also contains an internal clock/calendar database so that the system can instruct the caller in how to enter date and time information in correct syntax, and can also be setup to recognize keypad entries containing the time signatures AM or PM, thereby indicating to the system that a callers time entry has been completed.

The system can accommodate multiple simultaneous calls over multiple connected telephone lines, and can scan each telephone line to determine the status of each line and the call progress of each connected caller, so as to collect useful tracking information and statistics for the system operator.

DETAILED DESCRIPTION OF THE PREFERRED EMBODIMENT

Referring now to the drawings, and initially to FIG. 1 thereof, a diagrammatic representation of the interactive transit information system in accordance with the invention is generally designated at 10. The system 10 is capable of simultaneously handling up to 20 individual callers on incoming lines 12. However, and as will be apparent from the following description, the system 10, due to its modular nature, may be expanded to simultaneously handle any number of incoming calls. While the system 10 is described below in connection with a train system, once this description is known, those skilled in the art will recognize that is applicable to bus and air transportation systems as well. Accordingly, the references below to stations should be understood to encompass bus stops, airports, car pool stops, etc.

The preferred embodiment of the system 10 employs a computer, preferably an IBM PC AT or equivalent, generally designated at 14. As shown in FIG. 1, the computer 14 includes a 30M hard drive 16 and 640 k of RAM 18. The telephone lines 12 communicate with the computer 14 through interface circuit boards 20, five of which are shown in FIG. 1, each of which is capable of handling up to four phone lines. The interface circuits 20 are conventional and each may comprise, for example, a Dialog/40 Voice Communications System board as manufactured by Dialogic Corporation, Parsippany, N.J. These boards are designed for installation in the expansion slots available in the computer 14 and include appropriate connectors accessible from the back of the computer for connection to the phone lines 12. The manner for interfacing the system 10 with various phone systems, such as PBX systems, will be readily apparent to those of ordinary skill in the art.

The operation of each board 20 is controlled by a program 160 resident on the hard disk 16 in the computer 14. When so controlled, each board 20 is capable of sensing the status of each incoming line 12 thereto, answering any ringing line by simulating an off-hook condition, converting the tones generated over an incoming line 12 to a digital format, converting an analog speech signal from a microphone to a digital format and vice versa, and terminating a call by creating a "hangup" condition for a specific line. As the specific circuitry on the boards 20 for accomplishing these objectives is well known to those of ordinary skill in the art, a further description thereof is deemed unnecessary. Suffice it to say, however, that the proper operation of the boards 20 in the system 10 to achieve the system's objectives is possible only through control of the boards 20 by the aforementioned program 160 resident on the hard disk 16. As already noted, the boards 20, as well as the hard disk 16 and RAM 18, are resident in the housing for the computer 14. They are shown as separate elements in FIG. 1 solely for purposes of illustration.

Also diagrammatically illustrated in FIG. 1 are a CRT screen 22, a keyboard 24 and a printer 26, which may comprise any screen, keyboard and printer compatible with the computer 14. The functions of these components in the system 10 will be more fully explained below.

Stored in a database 162 at specific addressable memory locations on the hard disk 16 are a plurality of speech files. Each speech file comprises a digitally coded word or phrase. For example, there is a separate speech file for each of the numbers 1 through 100, for each station name, and for phrases such as "push the numbers indicating the time you would like to leave, followed by the letters a.m. or p.m.", etc. These speech files are created when the system is initialized utilizing the Vbase program of Dialogic Corporation. With the Vbase program running, a speech file is created by speaking into a microphone connected to a microphone input jack (not shown) on one of the boards 20, the jack being accessible from the back of the computer 14. The output signal from the microphone is converted on the board 20 to a digital signal which is then transmitted on the system bus to the processor in the computer 14 which, under the direction of the program, stores that digital signal at a specific addressable memory location on the hard disk 16. As many speech files as are necessary may be created. Subsequently, when the program indicates that a specific speech message is to be relayed over one of the lines 12 to a caller, the program accesses the address in memory containing the digital data presenting the desired speech message, extracts the digital information, and then transmits the data to the appropriate board 20 via the system bus. At the board 20, the data is converted to the usual analog signal suitable for transmission over the appropriate line 12 to the caller, the analog signal being converted to audible speech at the speaker in the caller's receiver (not shown). Actually, and as will be more fully explained below, many of the messages transmitted by the system 10 are made up of a plurality of independent speech files strung together in the proper sequence. In this way, individual speech files may be used as components in a plurality of different messages, thereby minimizing the number of speech files that must be created. This is an important consideration in a transit information system, where the number of different fares and schedule times may be quite large.

In addition to the speech files, additional information specific to the transit information system is stored in a database 162 on the hard disk 16. In particular, in the case of a transit information system, this additional information would comprise the schedule times and fares for all trains operating on the system. As will be more fully explained below, the operator of the system 10 may readily change fare and schedule information as necessary.

After the speech files have been created and the appropriate fares and schedules input, the system 10 may be placed on-line. The manner in which the system 10 responds to calls over the phone lines 12 is best understood with reference to FIGS. 2-6, which illustrate the decision tree structure of the program resident in the computer 14. The voice messages or prompts generated by the system 10 and shown in FIGS. 2-6 are generic and it should be understood, therefore, that the capitalized words in the prompts, for example "COMPANY NAME" in the prompt of FIG. 2 will, in practice, be replaced by the name of the specific transit information system, such as "New Jersey Transit".

When a caller rings the system 10 over the a line 12, the call is answered by the corresponding board 20 creating an "off-hook" condition. Each of the 20 lines is specifically identifiable by the program resident in the computer 14 which, in response to an off-hook condition, accesses the appropriate speech file for generating the greeting message prompt shown at the top of FIG. 2. As shown, if in response to this prompt the caller depresses the button on the telephone keypad 310 bearing the number "1" on a Touch-Tone (DTMF-type) phone 300, the system recognizes this as an indication that the caller desires transit information utilizing the system 10. If any other button is depressed, or if no digital signal is received for a pre-determined period of time, typically set at 5 seconds, the call is routed to an operator. This is necessary for those persons who are not calling from a Touch-Tone telephone, and for persons who do not wish to utilize the computerized transit information system. Actually, since this is done only to verify that the caller is using a Touch-Tone phone, the caller could be prompted to push any button.

Assuming that the caller depresses the button bearing the number "1" in response to the first prompt, this is communicated to the processor in the form of a digital signal generated on the respective board 20 and transmitted to the processor via the system bus. The program thereupon accesses the speech file from memory containing the second prompt, which is shown in the lower half of FIG. 2. The "HUB STATION" in the second prompt will, in practice, be the name of the main station in the transit system. For example, for the case of New Jersey Transit, the hub station would be Penn Station. While, as will be apparent below, the second prompt could be dispensed with, the second prompt is desirable as typically many callers are either leaving from or travelling to the hub station, and hence this option speeds the call time.

As shown, the second prompt presents the caller with the option of depressing one of three buttons on the Touch-Tone telephone. If the caller depresses one of those three buttons, that information is conveyed to the processor in the manner described above, whereupon the caller is presented with one of three prompts, depending on which of the three push buttons has been depressed. For example, if button "1" is depressed, indicating that the caller intends to depart from the hub station, the processor accesses the speech file for the third prompt, and conveys same to the respective board 20 for transmission to the caller. If, in response to the second prompt, the caller depresses other than the buttons bearing the numbers 1–3, or does not depress any button, prompt 12 (FIG. 6) is initially transmitted to the caller and, if again the caller enters an incorrect response or fails to respond, the system transmits prompt 7 (FIG. 5), which terminates the call.

Referring now to FIG. 3, and assuming that the caller has depressed button 1 in response to the second prompt, the third prompt is then transmitted to the caller. This represents a significant aspect of the system 10 since, as will be evident from the prompt itself, the caller is not required to have access to a reference card identifying each station with a specific number code. Rather, and as the prompt indicates, all the caller need do is locate the first four letters of the station (a lesser number of letters may be used in a system with less station ambiguities) and then enter those letters by depressing the appropriate buttons on the keypad of the Touch-Tone telephone. For the system 10 to function properly, each station must be identified with a unique sequence of tones, which is converted to a unique digital code by the respective board 20. In the absence of a unique tone sequence for each station, the system 10 could not identify the caller's intended station destination. This problem is compounded by the fact that each of the buttons bearing numbers 2–9 on the keypad of a Touch-Tone telephone also bears three letters, so it is conceivable that two or more stations, even though they do not have the same first four letters, would still result in the same sequence of tones. Also, this makes it impossible to check for possible ambiguities by simply checking the first four letters of each station name.

To avoid this situation, when the system is initialized, the program compares the tone sequences corresponding to the first four letters of each station to detect possible ambiguities. Actually, the system 10 compares the digital representations of the tone sequences as generated by a board 20 and communicated to the system processor. Ambiguities are displayed to the system operator on the screen 22. The program then directs the system operator to assign an additional unique tone capable of being generated by the Touch-Tone keypad to each ambiguous station. For example, if two stations have the same tone sequence when there first four letters are entered on the Touch-Tone keypad, the system would then assign to the first station an additional digital code corresponding to the tone generated when the button bearing the number 1 is depressed, and to the second station an additional digital code corresponding to the tone generated when the button bearing the number 2 is depressed. An additional prompt would then be added to the dialogue after the third prompt shown in FIG. 3. For example, if the two ambiguous stations are New Haven and New Hope, the additional prompt could be:

"Push 1 for New Haven, 2 for New Hope."

In this way, all ambiguities between stations are eliminated without requiring the caller to enter an inordinate number of letters in the station name. If the particular station name has less than four letters, for example, Rye, after a predetermined pause after entry of the third letter, e.g. five seconds, the system searches its data base for the tone sequence depressed by the caller to determine if there is a three letter station name with that sequence.

Another approach to reducing ambiguities between station names is to require the caller to first specify one of several routes in the system before entering the initial four letters of the station name. This may be necessary, for example, in transit systems having excessive number of ambiguous station names. Once this description is known, those of ordinary skill in the art will recognize yet additional techniques for establishing sub-groups of stations prior to caller entry of the station name for the purpose of reducing an excessive number of ambiguities. Of course, in a system with a limited number of stations, each station could be assigned a specific Touch-Tone number sequence, which sequences would then be incorporated in the prompt. For example, "Push 1 for Grand Central Terminal, 2 for 125th Street, etc.". This avoids the necessity for the caller to spell the initial part of the station name.

There is also the possibility that the first four letters of a station name will include the letters q or z, neither of which is represented on the keypad for a Touch-Tone phone. In this event, the system anticipates that the caller will search for, and not find, those letters, whereupon, after a specified pause, the caller will be connected to an operator. Alternatively, prompt 3 could be modified to direct the caller to depress a unique tone sequence for a station with a q or z in the first four letters; e.g.: "If the station is Queensville, Push 7"

If, in response to the third prompt, the caller enters an invalid station name, i.e. the first four letters of the station name entered by the caller do not correspond to any of the station names in the data base file, the system 10 communicates prompt 13 and, if the caller again enters an invalid station name, prompt 7 is communicated.

Assuming the caller enters a valid station name, and referring to the left hand portion of FIG. 3, the system accesses the appropriate speech file for that station name and communicates it to the caller. This gives the caller opportunity to verify that the correct station name has been entered, as evidenced by the fourth prompt shown at the top of FIG. 4.

Of course, if the caller, in response to the second prompt (FIG. 2) had depressed number 2, then the third prompt heard by the caller would request the first four letters of the station the caller is leaving from. Similarly, if the caller had depressed number 3 in response to the second prompt, the caller would be prompted to spell the first four letters of both the starting and destination stations for the caller's trip.

Referring again to FIG. 4, assuming the station name repeated to the caller is correct, the caller is prompted to depress one of the numbers 1, 2 or 3, depending upon the schedule desired. Assuming the caller does so, the system communicates the fifth prompt, requesting the caller to enter the time of departure in numbers followed by a.m. or p.m. If the caller presses other than the numbers 1, 2 or 3 in response to the fourth prompt, or enters an invalid time in response to the fifth prompt, the system communicates the various prompts illustrated in the dialogue tree shown in FIG. 4, the specific wording of the various prompts being shown in FIGS. 2–6.

As indicated, in response to the fifth prompt, the caller is requested to depress the numbers corresponding to the desired time of departure, followed by the letters a.m. or p.m. On a Touch-Tone keypad, a.m. is represented by the numbers 2 and 6 and p.m. is represented by the numbers 7 and 6. The system recognizes these as "terminators", i.e. once a 26 or 76 is entered as part of the callers response to the fifth prompt, the system recognizes that as the conclusion of the time entry. This approach permits the caller to identify a desired departure time in response to a single prompt and without requiring the system to detect a pause at the conclusion of the entry to confirm that the entry is complete. Of course, in lieu of desired departure times, the system could be programmed for the caller to enter the desired arrival time at the destination station.

In the example at hand, assuming the caller enters a valid time in response to the fifth prompt, the system searches the schedule in its data base for trains leaving from the hub station. In particular, the system locates the departure times for the two trains leaving prior to but closest in time to the departure time preferred by the caller, and also locates the departure times for the two trains leaving after but closest in time to the preferred. The system then searches for the times when those trains arrive at the destination station whereupon the system generates a message (top of FIG. 5) stating the departure and arrival times of the four above-mentioned trains. The search program eliminates illogical train choices. For example, if there is a local train which departs at 3:45 pm and arrives at the destination at 4:30 pm, and an express which departs at 4:00 pm and also arrives at 4:30 pm, the system will not transmit information to the caller about the earlier train, as selection of the local train would be illogical. Of course, the departure and arrival times for more or less than four trains could be given instead.

Figure 4:
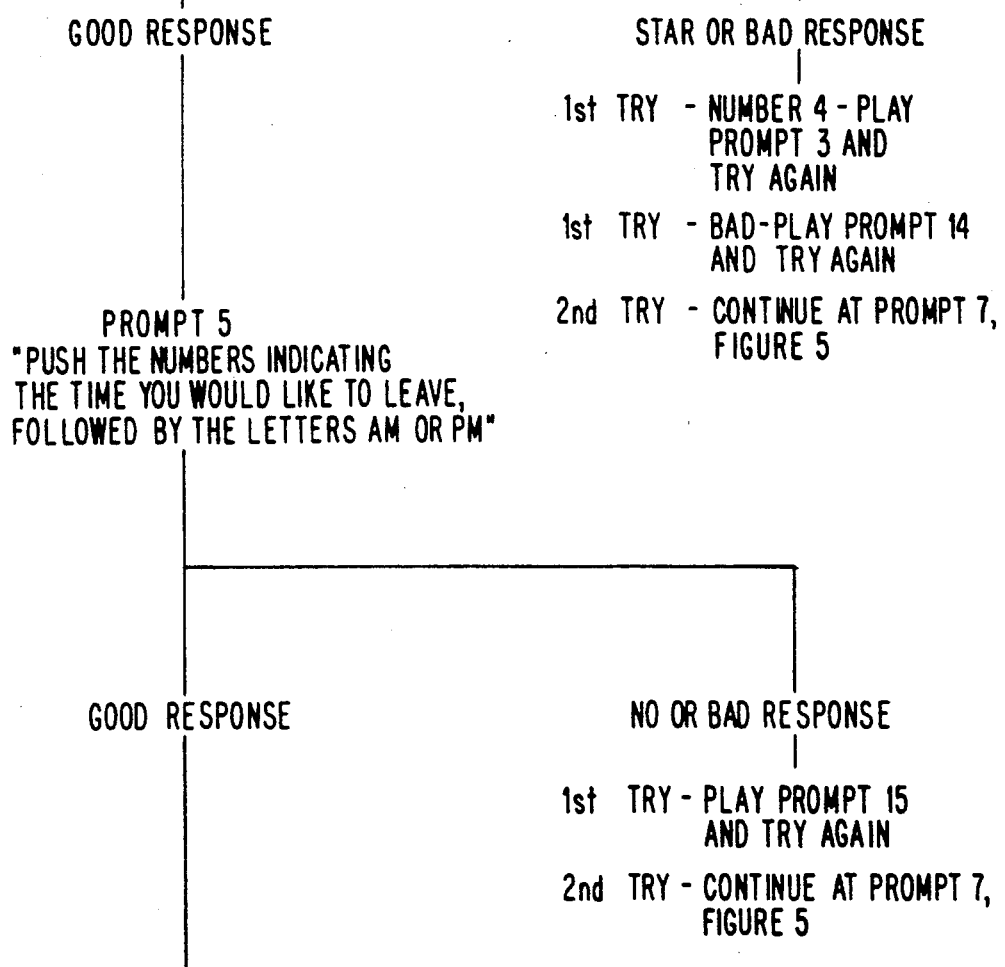
FIG. 4 is still another part of the dialogue tree.

At this point, the system generates the sixth prompt from the speech files. As shown, this provides the caller with the option of selecting additional departure times, requesting fare information, requesting return trip information or starting the dialogue from the beginning. If the caller requests additional departure times, as evidenced by depressing the number 1 on the Touch-Tone keypad, the system cycles that caller back to the fifth prompt (FIG. 4). If the caller desires to start the dialogue from the beginning, as evidenced by depressing number 4, the system cycles the caller back to the second prompt (FIG. 2). If the caller depresses number 2 to request fare information, the system searches its data base file and generates a voice message with the appropriate fare information for the four selected trains. If the caller depresses the number 3, he will be cycled to prompt 4. Actually, the caller will hear a modified form of prompt four starting with "For departures between . . . ". There is no need to reenter station information, as the system knows the departure and arrival stations by simply reversing the caller's initial request.

The system next generates the seventh prompt which offers the caller the option of starting the dialogue over by depressing any button on the keypad. If the caller selects this option, the system cycles that caller to the second prompt (FIG. 2). If no response is received, the system terminates the call by first providing the voice message of prompt 8, and then instructing the respective board 20 to "hang-up" the line 12 in question.

As already noted, during initialization of the system 10, the necessary speech files are created. Each speech file has a unique addressable memory location which can be accessed by the system for transmission to the respective board 20 where the digitally encoded speech files converted to an analog signal suitable for transmission over conventional phone lines. The system creates the appropriate information to be conveyed to the caller by piecing together the necessary speech files in the proper order. For example, returning to FIG. 5, the schedule information message in the form of "there is a train at TIME which will arrive at TIME" is pieced together by assembling eight separate speech files. For example, for a train leaving at 3:15 p.m. and arriving at 4:05 p.m., the eight speech files are shown in FIG. 7. By employing a system wherein the numbers from 1 to 99, 01 to 09 and "hundred" are each in a separate speech file, it is possible to create a voice message for all possible times, fares and routes, with minute and cent discrimination, respectively, with only 109 number speech files. That is, there is no need to create a separate speech file for each of the 720 (12×60) possible times.

It should be noted that the program operating the system 10 repeatedly scans all 20 lines. During each scan, the system retrieves information entered by callers and provides digitally encoded speech messages to those lines awaiting same. The system tracks of each line independently, i.e. the status of each line vis-a-vis the dialogue. So, for example, if when scanning the third line, the system detects a digital signal indicating that the user has depressed push button 1 in response to the second prompt (FIG. 2), the next time the system scans the third line, it will down load a digitally coded voice message corresponding to the third prompt (FIG. 3). That voice message will be stored in a buffer on the respective board 20 where it will be converted to an analog signal for real time transmission to the caller. Of course, once the digitally coded voice message is down loaded to the board 20, the scan moves on to the next line, i.e. it does not remain on the third line until the voice message is transmitted to the caller. Since all operations on the 20 incoming lines are performed in a matter of milliseconds, the callers perceive the response from the system 10 as substantially instantaneous.

DATA BASE MAINTENANCE

The interactive transit system 10 in accordance with the present invention also provides the system operator with various options. These options are accessed by entering an appropriate password which, upon entry, retrieves a menu of data base operations available to the system operator. The main menu is shown in FIG. 8. The first option, accessed by depressing the number 1 on the keyboard 24, allows the system operator to make schedule changes. After typing in the name of the route in question, and the particular station for which the schedule is to be changed, the system operator is presented with a screen display of the type illustrated in FIG. 9. The reference to departure and arrival times in FIG. 9 is a reference to inbound and outbound trains, respectively. The numbers on the screen represent the times when inbound and outbound trains are at the station in question, shown in FIG. 9 as Matawan. The system operator can then change the schedule for Matawan by entering appropriate keystrokes on the keyboard 24 in accordance with the editing functions applicable to the system 10. By selecting menu option 2 in FIG. 8, the system operator may selecting the apropriate route and zone, the system operator is presented with a screen similar to FIG. 10, whereupon one or more fares may be changed, again by utilizing the system editing functions.

Menu option 3 in FIG. 8 allows the system operator to make a floppy diskette backup of the entire schedule and fare data base. As the backup is made, the route and station name for each file being copied is displayed on the screen 22.

Option 4 from the main menu of FIG. 8 enables the system operator to change the system password for security purposes. Option 5 enables the system operator to change the entire schedule and fare data base. Typically, this option is only utilized when the system is initialized. Subsequent changes to the schedule and fare data base are effected by utilizing options 1 and 2 from the main menu (FIG. 8). Finally, option 6 from the main menu (FIG. 8) allows the system operator to exit the data base and return the system to an operational mode, ready for use by the general public.

The transit information system 10 also includes a call statistics feature which enables the system operator to keep track of relevant information. The program controlling the system 10 is structured such that the processor tracks each response entered by the callers at every different level of the dialogue of FIGS. 2-6. This information is useful to the transit company, for example, for improving service to commuters, as it identifies for the transit company information about percentage of commuters travelling to particular stations, commonly requested information, travel patterns, etc.

When the call statistics feature of the transit information system 10 is accessed, the system screen 22 displays the activity status of all 20 incoming calls in a format similar to that illustrated in FIG. 11. This allows the system operator to monitor the activity of the lines 12 and also evaluate approximate time taken by the system 10 to respond to each call. When a call is in progress, the line is indicated as "active", and when a call is terminated, the line status changes to "idle". When the call statistics feature is utilized, the system 10 can provide information indicating the total number of calls coming into the system, the total calls handled successfully by the system, (a successful call being one in which the caller was able to retrieve fare information, an emergency message or schedule information), information concerning the number of commuters requesting schedule or fare information for a particular route within the system, and hub statistics indicating the number of commuters calling for schedule information for arrivals and departures from the major hub in the system. The statistics are calculated on an hourly and daily basis, and a monthly summary is also provided. This statistical information can be stored on a diskette and a hard copy can be printed on the printer 26.

Figure 12:
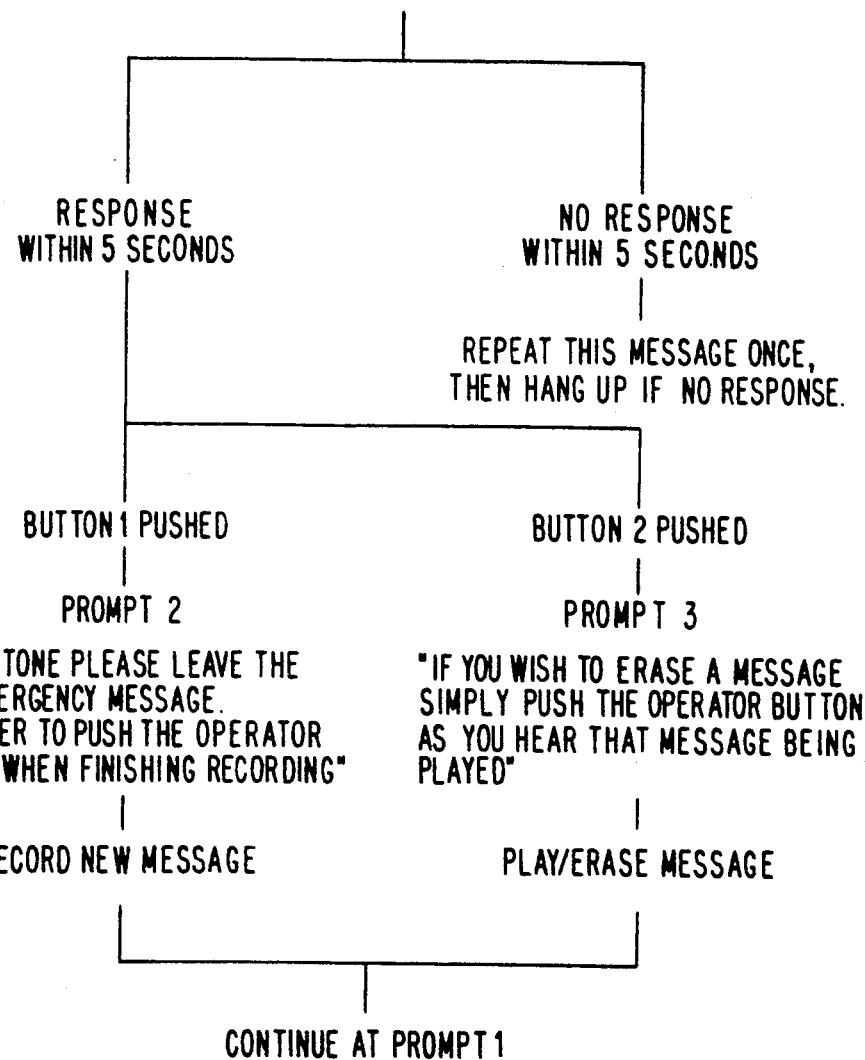
FIG. 12 is a partial dialogue tree for changing the greeting message in the interactive transit information system.

The system 10 also allows the system supervisor to update The system with an emergency message in a matter of minutes. This recognizes that transit systems seldom operate without unexpected delays, hazardous conditions, schedule interruptions, etc. To do so, the system supervisor accesses the transit information system 10 in the same manner that any other caller would access the system, i.e. by dialing the appropriate telephone number. At this point, the supervisor enters the six digit system password. If the correct password is not entered within a preset time the system hangs up. If the entered password is correct, the system responds with the dialogue tree illustrated in FIG. 12. As shown in FIG. 12, the first prompt permits the system supervisor to record a new emergency message by pushing the number 1 in response to the first prompt. After the number 1 is pushed, the supervisor receives a second prompt instructing him to speak the new emergency message into the phone and to push the "operator" button when the message is completed. Whatever the supervisor speaks into the telephone becomes the new greeting message. That is, the message recorded by the system supervisor replaces the first prompt heard by callers (FIG. 2). As indicated in FIG. 12 after recording a new message, the supervisor has the option of playing it back or erasing it.

Figure 13:
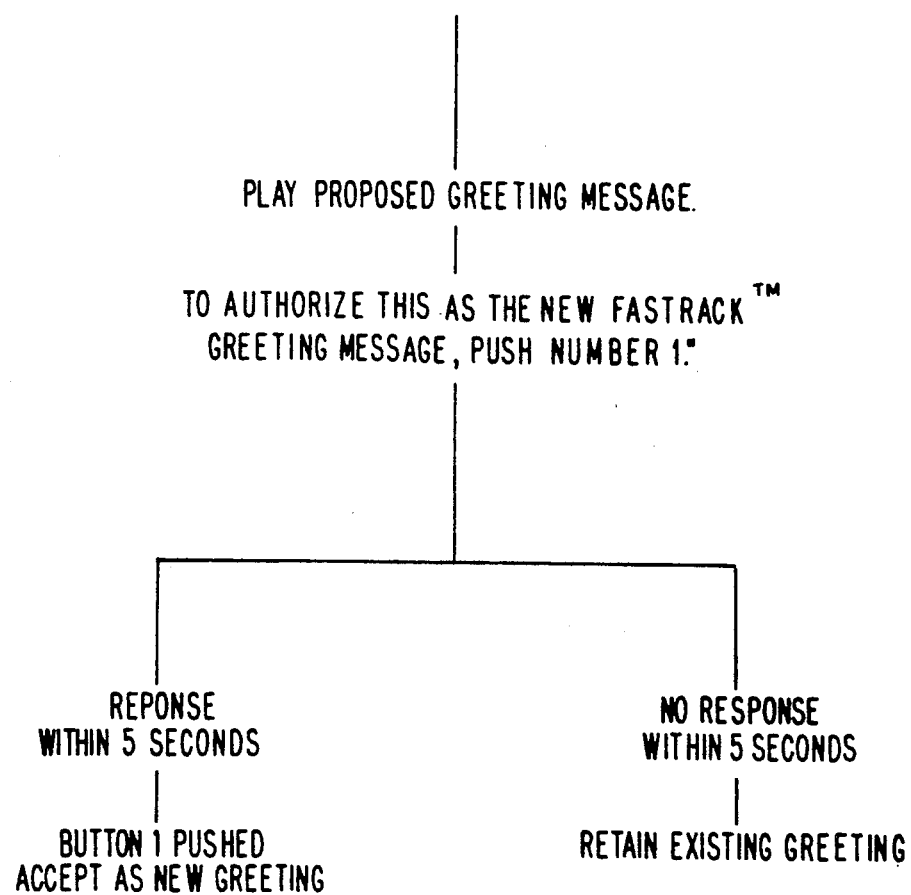
FIG. 13 is a dialogue tree verifying a new greeting message for the transit information system.

After a new message is entered, the system 10 initiates a call to a preset telephone number. Typically, the recipient is the travel information supervisor. After the travel information supervisor answers the phone, the system provides the series of prompts indicated in FIG. 13. This gives the travel information supervisor the option of confirming or rejecting the message. This, coupled with the password which must be entered to create a new message, provides security against tampering.

The system 10 is readily expanded by simply adding an additional computer 14 having additional circuit boards 20 therein. This expandability moreover, allows the system 10 to handle as many lines as necessary. Because the system is expandable by simply adding additional units, the system is rendered more reliable, as a defect in one processor has no effect on the lines being handled by other processors. If desired, the databases from individual computers 14 could be linked to a host computer. This would permit the system operator to change fare or schedule information for all of the computers 14 from the host computer, introduce an emergency message to all the computers 14 from the host, centralize statistics, etc.

From the foregoing discussion, it will be apparent that the transit information system 10 in accordance with the present invention, while relatively inexpensive, provides a powerful tool for transit information systems to convey fare, schedule and other information to commuters without the cost of an excessive number of operators, and does so in a manner that keeps the call time to a minimum, thereby reducing caller frustration and in increasing efficiency.

As an alternative to the method of selecting the departure day as shown in prompt 4 of FIG. 4, for some systems it may be desirable to have the user indicate the specific date of departure, i.e., by month and day, e.g., Jan. 14, Apr. 19, etc. This approach may be desirable, as some users who desire to travel on a particular future date may be unaware whether that date falls on a weekday, weekend or holiday. So, for example, such systems may include, in place of prompt 4, prompt 4A shown in FIG. 14. If in response to prompt 4A the caller pushes 1 or 2, the system checks its internal calendar/clock 164 whereupon it selects the appropriate schedule file e.g., weekday, Saturday, or Sundays and Holidays, by using the schedule for the current date (if 1 is depressed), and the current date incremented by one (if 2 is depressed), whereupon the caller is returned to prompt 5 in FIG. 4. Of course, a bad response will be handled in a manner analogous to that shown in FIG. 4.

If the user depresses the number 3, the system will check its internal calendar/clock 164 and then access the appropriate speech files for the current date. That date will then be transmitted to the caller utilizing the syntax which the caller should utilize for inputting the desired departure date. For example, assuming todays date is Jan. 21, the caller, in response to depressing pushbutton 3, will hear the message "today's date is 1 21. Please enter the date you wish to depart."

Once the caller enters the desired date of departure, the system must parse the month/days digits inputted by the caller to determine the desired date of departure for any possible month/day combination. In this regard, certain ambiguities must be resolved.

For example, an entry of 11* or 12* (where * is any digit from 0 through 9) is potentially ambiguous since it may be interpreted as either the months of November or December, respectively, with a single digit date, or as the month of January, with a double digit date. The system resolves this potential ambiguity as follows. If the current month is January (month 1) then an entry of 11* or 12* is assumed to be a request for a departure date in January as opposed to November or December (provided the assumption of a January date does not yield a date already passed), since it is most likely that a caller is requesting a departure date for the current month. On the other hand, if the current month is beyond January, the system will assume a departure date in November or December, again based on the logic of resolving the ambiguity in favor of the closest future date. If the first digit depressed by the caller is between 2 and 9, there is no question as to the month, since there are no double digit months that begin with any number greater than 1. Consequently, after receiving an initial input of 2-9, the system then looks for a 1 or 2 digit date number. Similarly, if the first day number inputted is 4 through 9, there is no need to wait for a second date digit, as there are no double digit dates that begin with a number greater than 3.

Figure 14:
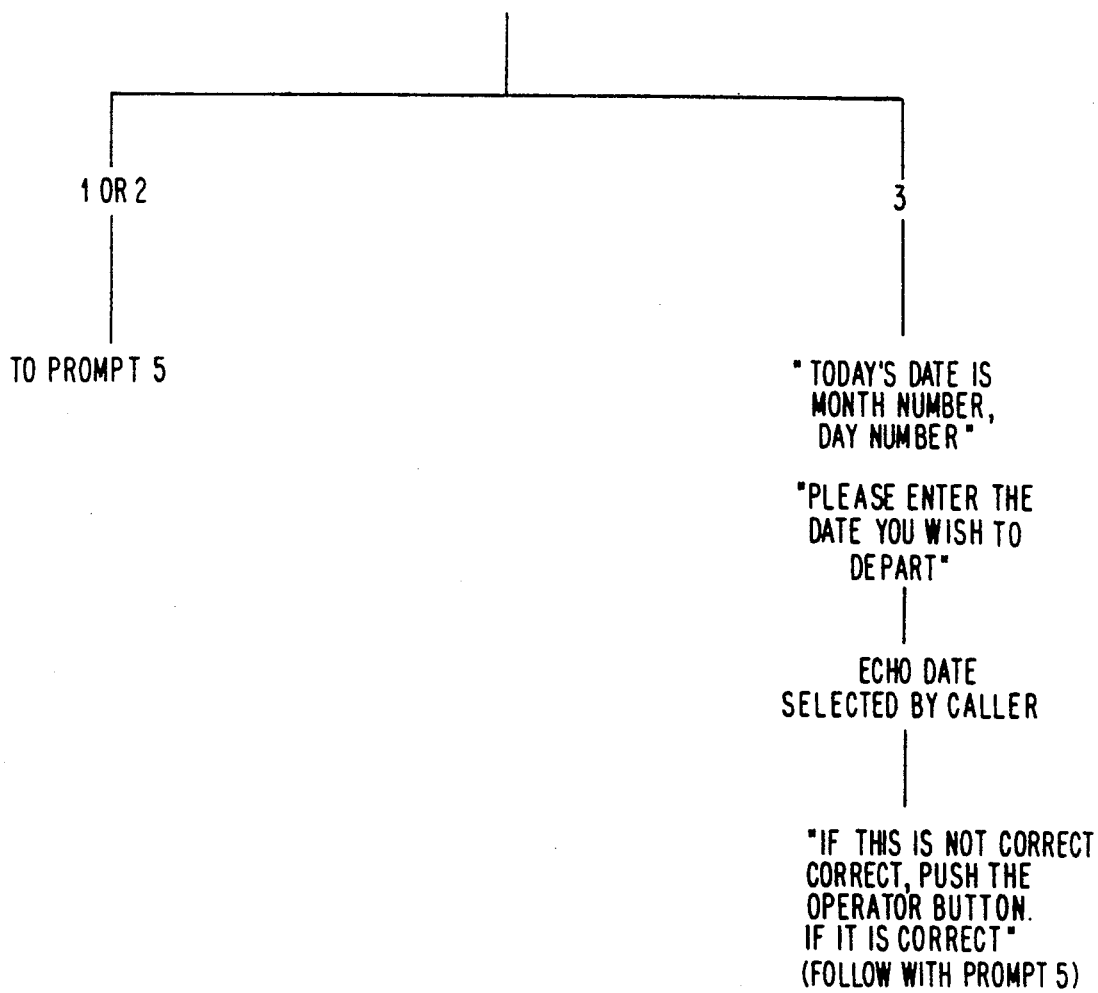
FIG. 14 shows an alternative part of the dialogue tree of FIGS. 2-6.

It will now be apparent that the maximum number of caller digit inputs to select a departure date is four, assuming a double digit month (i.e., October through December) and a double digit date (i.e., 10-31). Therefore, in those instances where the date selected requires the input of less than four digits, (i.e., two digits e.g., Jan. 9) or three digits (e.g., Feb. 19), the system relies upon a preselected pause length between digit inputs to determine that the caller has completed entering the desired departure date. For example, a pause time of five seconds may be preselected. Once it is determined that the caller has completed entry of digits corresponding to the desired departure date, and that departure date is determined by the system utilizing the method for resolving ambiguities described above, the system then compiles a voice message corresponding to the desired date of departure, and "speaks" it to the caller. This may be done in a variety of ways, e.g., "Tuesday, 2 21" or "Tuesday Feb. 21", etc. In either event, the system then proceeds as shown at the bottom of FIG. 14 right branch in FIG. 14 for returning the caller to prompt 5.

These ambiguity resolution techniques, coupled with the use of pause time to verify completion of date entry and "echo" back of the date selected by the caller, are perceived as the most efficient and user friendly approach for verifying the caller's desired travel date.

Where the number of departures during the day is relatively low, an alternative to prompt 5 for having the caller enter the desired time of departure is shown in FIG. 15, wherein it can be seen that prompt 5A asks the caller if he wishes to hear morning departures (by depressing pushbutton 1), afternoon departures (by depressing pushbutton 2), evening departures (by depressing pushbutton 3) or all departures (by depressing pushbutton 4). A bad response is handled in a manner analogous to that shown in FIG. 4 for prompt 5.

Figure 5:
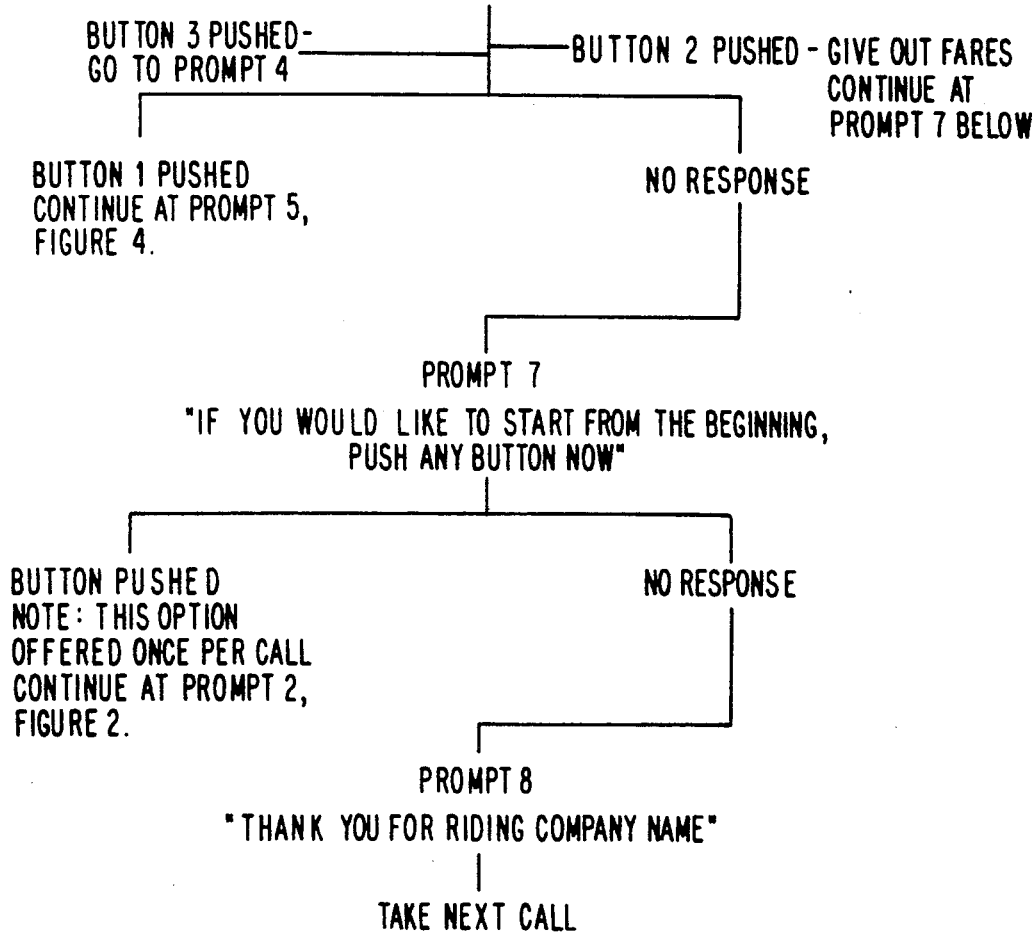
FIG. 5 is yet a further part of the dialogue tree.

Assuming one of the pushbuttons 1-4 is depressed in response to this prompt, the caller will receive appropriate departure and arrival information, preferably in the format shown at the top of FIG. 5, whereupon the system will continue with lines 2-4 of prompt 6.

While I have herein shown and described a preferred transit information system in accordance with the present invention, those skilled in the art will recognize that still further changes modifications may be made therein without departing from the spirit and scope of the invention. Accordingly, the above description should be construed as illustrative and not in a limiting sense, the scope of the invention being defined by the following claims.

I claim:

1. A method of utilizing a telephonic voice response system for providing travel-related, spoken voice information over a telephone line to a telephone caller utilizing a keypad on a DTMF-type telephone, the method comprising:
   (a) assigning a digital code specific to each station in a transportation system, the digital code having a predetermined, fixed number of characters, which code is representative of the spelling of at least a portion of the name of the station as spelled-out on a DTMF-type telephone keypad;
   (b) providing a database for storing said digital codes;
   (c) storing transportation schedule information in said database to form a schedule database;
   (d) storing a plurality of individual speech files in said database in modular form for generating voice messages from said database by sequentially accessing a plurality of individual speech files to create a spoken voice message capable of being transmitted over a telephone line and heard as spoken sounds by a telephone caller;
   (e) generating a first voice message prompt to said caller instructing said caller to enter, by depressing at least one button on the DTMF keypad corresponding to the correct spelling thereof, the name of a desired departure station;
   (f) generating a second voice message prompt to said caller instructing said caller to enter, by depressing at least one button on the DTMF keypad corresponding to the correct spelling thereof, the name of a desired arrival station;
   (g) generating a third voice message prompt to said caller instructing said caller to enter, by depressing at least one button on the DTMF keypad corresponding thereto, the desired time of at least one of departure and arrival;
   (h) searching said schedule database in response to the caller's keypad entries in steps (e), (f) and (g) for locating the scheduled departure time of a transportation vehicle departing the desired departure station at a time closest to the desired time entered in step (g); and
   (i) generating a voice message to said caller identifying a scheduled departure time of a transportation vehicle from the desired departure station and a scheduled arrival time of the transportation vehicle at the desired arrival station.

2. The method of claim 1, wherein the message prompts of steps (e) and (f) respectively instruct the caller to enter, by depressing at least three buttons on the DTMF keypad corresponding to the correct spelling thereof, the name of the desired arrival station and the name of the desired departure station.

3. The method of claim 2, wherein step (a) further comprises the steps of:
   utilizing a DTMF tone generator to generate DTMF tone keypad entry sequences corresponding to the spelling of each station name;
   comparing said generated DTMF tone keypad entry sequences corresponding to at least the first three letters of the spelling of each station name to detect station codes having the same DTMF tone sequence; and
   assigning an additional unique DTMF tone to each station code detected in the above-mentioned step so as to render unique each station code and thereby avoid ambiguity in station selection by a caller.

4. The method of claim 1, further comprising the step of generating a voice echo message in response to the entry by the caller of and corresponding to the spoken identification of at least one of a desired departure and arrival station and at least one of a desired departure and arrival time.

5. The method of claim 1, wherein the message prompts of steps (e) and (f) instruct the caller to enter, by depressing at least four buttons on the DTMF keypad corresponding to the correct spelling thereof, the name of the desired arrival station and the desired departure station.

6. The method of claim 2, further comprising the step of generating an additional voice message prompt instructing said caller to select, by depressing at least one additional button on the DTMF keypad, one station name from among a plurality of station names for which the first three letters of the station name requires depressing, on the DTMF keypad of the telephone, the same three buttons in the same sequence.

7. The method of claim 2, wherein step (i) additionally comprises the step of accessing a plurality of individual speech files from the database and constructing a sequential voice message therefrom.

8. The method of claim 2, wherein steps (e) and (f) respectively additionally comprise the step of generating voice message prompts instructing the caller to indicate, by depressing at least one button on the DTMF keypad, whether the caller is departing from or arriving at a hub station.

9. The method of claim 2, wherein step (g) comprises generating voice message prompts instructing the caller to enter, by depressing at least one button on the DTMF keypad corresponding thereto, at least one of the desired date of departure and arrival and at least one of the desired time of departure and arrival.

10. The method of claim 9, further comprising the step of generating a voice message prompt instructing the caller to depress at least one button on the DTMF keypad to return to a prior voice message prompt.

11. The method of claim 9, further comprising the step of routing the caller to a live operator if, in response to a voice message prompt, one of either an invalid response and no response is received.

12. The method of claim 11, further comprising the step of generating a voice message prompt to the caller in the event that any of the first three letters of a station name to be spelled out on the DTMF keypad is at least one of the letters q and z.

13. The method of claim 9, further comprising the step of generating a voice message prompt to the caller in the event that any of the first three letters of a station name to be spelled out on the DTMF keypad is at least one of the letters q and z.

14. The method of claim 2, wherein step (g) further comprises:
   instructing said caller to enter, by depressing buttons on the DTMF keypad of a telephone corresponding thereto, the desired month and day of departure;
   providing an internal calendar/clock database portion stored in said database, said calendar/clock database portion containing at least the current time and date;
   accessing the internal calendar/clock database portion to extract the current date; and
   accessing the appropriate speech files and generating therewith a voice message indicating to the caller the current date in the syntax which the caller should use for entering the desired departure date.

15. The method of claim 9, further comprising the step of recognizing, as keypad entry terminators, depressions of the DTMF keypad buttons corresponding to at least one of the letter strings AM and PM so as to allow a caller to confirm that a time entry has been completed.

16. The method of claim 9, further comprising the step of recognizing that a predetermined pause time period has elapsed without any DTMF keypad entries being made by the caller, and the step of recognizing the depression of at least one predetermined DTMF keypad button prior to said predetermined time period elapsing, each of the aforementioned steps resulting in a determination by the system that the caller's keypad entry has been completed.

17. The method of claim 9, further comprising the steps of connecting a plurality of telephone lines to the system so as to enable multiple telephone callers to access the system simultaneously over said telephone lines, scanning the telephone lines accessing the system, determining the status of each line, and determining the level of each caller's progress through a call for each information call in progress.

18. The method of claim 17, further comprising tracking relevant statistics compiled from calls received by, and information requested from, the system.

19. The method of claim 9, further comprising entering updates to the schedule information stored in said database by dialing into the information system via a DTMF-type telephone and entering a password on the DTMF keypad so as to access system editing functions which allow modification of at least one of the voice messages to be transmitted to the caller and the stored transportation schedule.

20. The method of claim 18, further comprising entering updates to the schedule information stored in said database by dialing into the information system via a DTMF-type telephone and entering a password on the DTMF keypad so as to access system editing functions which allow modification of at least one of the voice messages to be transmitted to the caller and the stored transportation schedule, and so as to access system reporting features which allow remote collection of the relevant statistics tracked by the system.

21. The method of claim 9, further comprising the step of providing a video screen and a keyboard in communication with said database for enabling an operator to edit same.

22. The method of claim 14, further comprising the step of resolving ambiguities in the DTMF keypad entry corresponding to the desired departure date entered by the caller, said ambiguity resolving step comprising:

scanning said calendar portion of the internal calendar/clock database portion of the database to find various valid dates which match the DTMF keypad entry made by the caller; and selecting, as the desired date, the closest future date which matches the DTMF keypad entry made by the caller.

23. The method of claim 9, further comprising the steps of:

comparing digital representations of DTMF tone sequences corresponding to at least the first three letters of the spelling of each station name to detect a match between station names having the same first three letters in its spelling; and assigning an additional unique DTMF tone to each digital representation of DTMF tones detected in the aforementioned step so as to avoid ambiguities in the selection of a desired station by a caller.

24. A method of utilizing a telephonic voice response system for providing travel-related, spoken voice information over a telephone line to a telephone caller utilizing a keypad on a DTMF-type telephone, the method comprising:

(a) assigning a digital code specific to each station in a transportation system, the digital code having a predetermined, fixed number of characters;

(b) providing a database for storing said digital codes;

(c) storing transportation schedule information in said database to form a schedule database;

(d) storing a plurality of individual speech files in said database in modular form for generating voice messages from said database by sequentially accessing a plurality of individual speech files to create a spoken voice message capable of being transmitted over a telephone line and heard as spoken sounds by a telephone caller;

(e) generating a first voice message prompt to said caller instructing said caller to enter, by depressing one button on the DTMF keypad, the name of a desired departure station;

(f) generating a second voice message prompt to said caller instructing said caller to enter, by depressing at least one button on the DTMF keypad, the name of a desired arrival station;

(g) generating a third voice message prompt to said caller instructing said caller to enter, by depressing at least one button on the DTMF keypad corresponding thereto, the desired time of at least one of departure and arrival;

(h) searching said schedule database in response to the caller's keypad entries in steps (e), (f) and (g) for locating the scheduled departure time of a transportation vehicle departing the desired departure station at a time closest to the desired time entered in step (g); and (i) generating a voice message to said caller identifying a scheduled departure time of a transportation vehicle from the desired departure station and a scheduled arrival time of the transportation vehicle at the desired arrival station.

25. The method of claim 24, wherein step (g) comprises generating voice message prompts instructing the caller to enter, by depressing at least one button on the DTMF keypad corresponding thereto, at least one of the desired date of departure and arrival and at least one of the desired time of departure and arrival.

* * * * *

UNITED STATES PATENT AND TRADEMARK OFFICE
CERTIFICATE OF CORRECTION

PATENT NO.    : 5,214,689  
DATED         : May 25, 1993  
INVENTOR(S)   : O'Sullivan, Daniel Page 1 of 1

It is certified that error appears in the above-identified patent and that said Letters Patent is hereby corrected as shown below:

<u>Title page,</u>  
Item [63], change "Ser. No. 155,146, Feb. 11, 1989" to -- Ser. No. 155,146, Feb. 11, 1988 --.

Signed and Sealed this

Fifth Day of November, 2002

Attest:

Attesting Officer

JAMES E. ROGAN  
*Director of the United States Patent and Trademark Office*